United States Patent [19]

Qvarth

[11] Patent Number: 5,454,671
[45] Date of Patent: Oct. 3, 1995

[54] INDEXABLE INSERT FOR FACE OR DISC MILLING CUTTERS, AND A CUTTER USING SAID INSERT

[75] Inventor: Ingemar Qvarth, Valbo, Sweden

[73] Assignee: Sandvik AB, Sandviken, Sweden

[21] Appl. No.: 157,010

[22] PCT Filed: Mar. 26, 1993

[86] PCT No.: PCT/SE93/00251

§ 371 Date: Nov. 30, 1993

§ 102(e) Date: Nov. 30, 1993

[87] PCT Pub. No.: WO93/19879

PCT Pub. Date: Oct. 14, 1993

[30] Foreign Application Priority Data

Apr. 2, 1992 [SE] Sweden .................................. 9201035

[51] Int. Cl.⁶ ................................................. B23P 15/28
[52] U.S. Cl. ............................. 407/42; 407/113; 407/53; 407/34
[58] Field of Search .............................. 407/42, 113, 114, 407/33, 34, 35, 53

[56] References Cited

U.S. PATENT DOCUMENTS

| | | | |
|---|---|---|---|
| 4,294,565 | 10/1981 | Erkfritz | 407/113 |
| 4,699,549 | 10/1987 | Shimomura et al. | 407/42 |
| 4,934,880 | 6/1990 | Stashko | 407/42 |
| 4,946,318 | 8/1990 | David et al. | 407/62 |
| 5,049,011 | 9/1991 | Bohnet et al. | 408/223 |

FOREIGN PATENT DOCUMENTS

| | | |
|---|---|---|
| 502541A1 | 9/1992 | European Pat. Off. . |
| 1036462 | 8/1983 | U.S.S.R. . |

*Primary Examiner*—Bruce M. Kisliuk
*Assistant Examiner*—Eileen P. Morgan
*Attorney, Agent, or Firm*—Burns, Doane, Swecker & Mathis

[57] ABSTRACT

A cutting insert for milling tools comprises upper and lower, opposite surfaces (2, 3) of which at least the lower (3) is substantially plane in order to form a base surface to be supported by a cooperating supporting surface of the milling tool, opposite first and second side surfaces (6, 6') and opposite third and fourth side or gable surfaces (7, 7') which each forms a main cutting edge along an edge line that is distanced from the base surface (3), which main cutting edge at its opposite ends joins secondary cutting edges (10, 10', 10", 10'"). Each of the two side surfaces (6, 6') is inclined and forms an obtuse angle with the base surface (3). The two secondary cutting edges joining a common main cutting edge are located in a common plane that forms an obtuse angle with each imaginary plane being parallel with the base surface. The corner angle between a secondary cutting edge and the adjacent main cutting edge is equal at at least two diametrically opposite cutting corners (9).

31 Claims, 8 Drawing Sheets

_Fig 8_

_Fig 9_

_Fig 10_

INDEXABLE INSERT FOR FACE OR DISC MILLING CUTTERS, AND A CUTTER USING SAID INSERT

In a first aspect, the present invention foresees a cutting insert intended for milling tools, e.g. facemills and side-and-facemills, comprising opposite upper and lower surfaces, of which at least the lower surface is substantially planar in order to provide a base surface that can be placed upon a corresponding support surface of the milling tool, mutually opposite first and second side surfaces and mutually opposite third and fourth side or gable surfaces, each of which forming a main cutting edge along the edge line distanced from the base surface, each main cutting edge at its opposite ends joining secondary cutting edges extending along said first and second side surfaces.

In a second aspect, the present invention foresees a milling tool provided with cutting inserts according to the invention.

Cutting inserts of the above described kind are in practice manufactured by form-pressing and sintering of an insert-forming powder of suitable composition, whereby the cutting insert obtains a specific geometrical basic form which is determined by the intended use. The cutting inserts can be delivered to the user directly in this basic form, i.e. without any final treatment, however the delivery is often made after at least one finishing treatment in the form of a so called peripheral grinding. At such a peripheral grinding utmostly thin layers of material are ground away, e.g. layers with a thickness of about 0,1 mm or less, primarily in connection with the cutting edges, i.e. on the side surfaces of the cutting insert, and in connection with the base surface, however not in connection with the upper surface. The purpose of this peripheral grinding is to confer to the insert very precise dimensions, in order to guarantee an absolutely correct positioning of the operative cutting edges when the cutting insert is mounted onto the milling tool. However, at such precision grinding the geometrical basic form of the cutting insert is not substantially altered.

At such milling tools as side-and-facemills, the periphery of the milling plate is equipped with cutting inserts of which every second protrudes from one side of the plate and every second protrudes from the opposite side of the plate, in order to achieve two plane, mutually parallel side surfaces in a groove in a workpiece, and usually a bottom surface perpendicular to the side surfaces, which bottom surface joins the side surfaces via rounded joints with more or less distinct radii. More specifically, the bottom surface of the groove is achieved by the main cutting edges of the cutting inserts, whereas the desired surface evenness of the side surfaces is accomplished by the secondary cutting edges, which extend perpendicularly to the main cutting edges, the radii between the bottom surface and the side surfaces being brought about by more or less distinctly rounded corners at the joints between the main and secondary cutting edges. The staggered or alternating positioning of the cutting inserts along the disk periphery has required that the inserts be formed in special left- and right-hand configurations in order to guarantee sufficient clearance between the groove side surfaces and the trailing part of the insert behind the secondary cutting edge. Because of this, the cutting inserts are often given a rhombic basic form, although they can also have a parallelepipedical basic form. This necessity of forming the cutting inserts in special left and right embodiments constitutes in practice a serious disadvantage, inter alia because of the simple reason that storage costs are doubled, and also because the work of replacing inserts is rendered more difficult since the operator has to keep the two types of inserts apart in two separate assortments.

One object of the present invention is to eliminate said disadvantage by avoiding the necessity of particular left and right cutting inserts. Thus, an important object of the invention in a first aspect is to create a uniform cutting insert which can be used on both sides of a side and facemill cutter as well as on either a left- or right-cutting facemill. A further object of the present invention is to create a cutting insert which can be modified with regard to its basic form while maintaining a large base surface that guarantees a long support line on the corresponding support surface of the milling tool. An analogous object is to create a cutting insert that makes possible a serial production of one standard configuration and which after storage at a later stage can be easily and quickly modified as to its form.

According to the present invention, the above mentioned objects are achieved by the cutting insert as defined in appending claims 1 to 6.

In another aspect, the present invention foresees a milling tool adapted to be mounted with cutting inserts according to the invention, according to appending claim 17.

A brief description of the drawings follows.

FIGS. 1 to 4 show in a stylized or purely geometrical form a cutting insert 1 with opposed upper and lower surfaces 2 and 3 of which at least the lower surface 3 is substantially plane to form a base surface to be placed on a correspondingly plane support surface of the milling tool. The upper surface 2 is in the present case divided into a main surface 4 and two part surfaces 5, 5' which will be further described underneath. Further, the cutting insert has two opposed first and second side surfaces 6, 6' (see also FIG. 3) which are inclined in relation to and form an obtuse angle with the base surface 3, and opposed third and fourth side or gable surfaces 7, 7' (see FIG. 2). The edge line 8, 8' between each such gable surface and the adjacent upper part surface 5 and 5' respectively, forms a straight main cutting edge which joins the secondary cutting edges 10, 10', 10" and 10'" via rounded corners or corner edge lines 9. In the present case, the edge lines 11, 11' between the substantially planar main upper surface 4 and the two inclined side surfaces 6, 6' are straight and form relief edges, as will be further described below. Also the lower edge lines 12, 12' between the side surfaces 6, 6' and the base surface 3 are in the present case straight and parallel to the edge lines 11 and 11'.

In the area of each of the insert's corners, facet surfaces 13 are formed along the sides, each facet surface being delimited by two upright delimiting lines 14, 15, of which the former extends perpendicularly to the base plane, more particularly from the end of the breaking line 16 that separates the individual part surface 5, 5' from the main upper face 4. Upwardly the facet surface 13 is delimited by an adjacent secondary cutting edge 10, 10', 10" and 10'", and downwardly by a lower edge line 17 which extends in an angle in relation with the previously mentioned edge lines 12. In practice the angle between the edge line 17 and an imaginary, straight extension of the edge line 12 should be between 1° and 3°, suitably between 1,5° and 2,5° and preferably about 2°. From the delimiting line 15 the facet surface 13 continues in a rounded or vaulted corner surface 18 which is upwardly delimited by said corner edge line 9 and downwardly by an analogous corner edge line 19. The delimiting line between the rounded corner face 18 and the adjacent side surface 7, 7' is designated 20.

The individual part surface 5 5', which is inclined in relation with the main upper surface 4, is made of a thickened part of the cutting insert with a wedge-like cross-section in the area adjacent to each side surface 7, 7'. The angle α between the individual part surface and the main surface 4 can suitably attain 165°. With other words, the surface 5, 5' is inclined by 15° in relation to an imaginary extension of the plane main upper surface 4. Since the plane or surface 4 is parallel with the base surface 3, the angle between the individual part surface 5, 5' (with pertaining secondary cutting edges) and said base surface also is 15°. Of course, the angle α can deviate from precisely 165°, but it should be between 155° and 175°, suitably between 160° and 170° and preferably between 164° and 166°.

The inner angle β between the base surface 3 and the individual side surface 7, 7' is advantageously 90° as shown in the drawing. However, also this angle can vary and be between 85° and 100° or, suitably, between 87° and 94°. The smaller this angle is, the larger the relative length will be of the base surface 3 abutting against the support surface of the mill. The inner angle ε between the base surface 3 and the individual side surface 6, 6' suitably is around 100°, which means that the side surface is inclined by about 10° in relation with a vertical plane through the edge 11 in accordance with FIG. 3. Also the angle ε can vary. However, it should be within the range 95° to 110°, suitably 97° to 105° and preferably 99° to 101°.

It should be noted that the two edge lines 10, 10'" forming secondary cutting edges and joining the edge line 11, are situated in the same imaginary vertical plane which is perpendicular to the base surface 3 and cuts through the edge line 11. Thus, in the projection shown in FIG. 4, the secondary cutting edges 10, 10'" are situated in the straight extension of edge line 11. In the same way, also secondary cutting edges 10' and 10" are in the same vertical plane as the edge line 11'.

Figure 8:
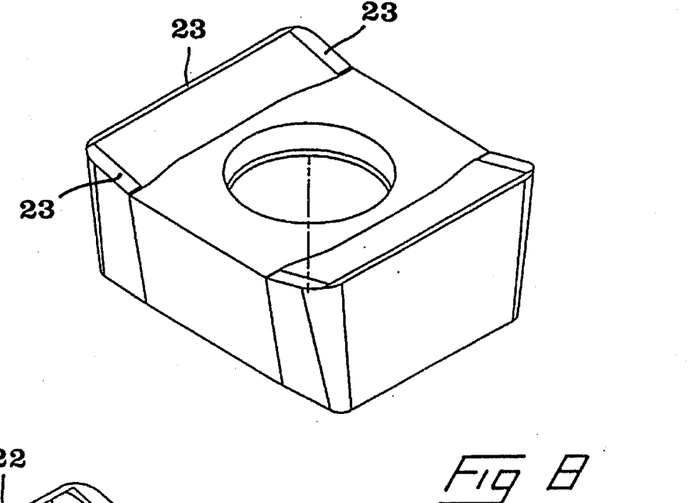
FIGS. 8 and 9 illustrate perspective views of cutting inserts according to the invention with upper surfaces of different alternative embodiments.
Figure 9:
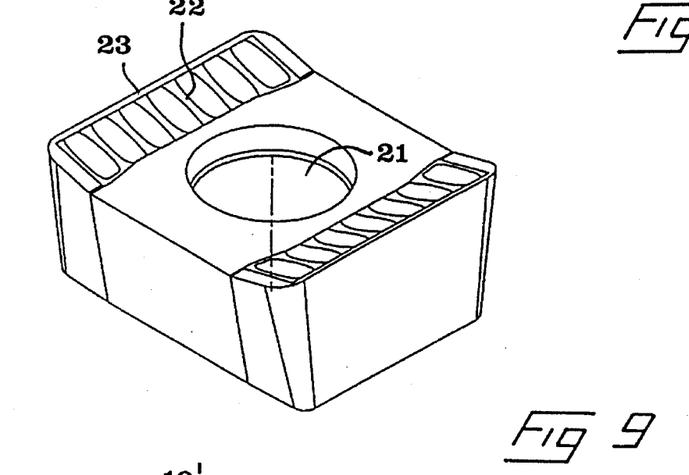

Further, it is pointed out that the cutting insert comprises a through-hole 21 for a fastening screw or similar. In FIGS. 1 to 4 this hole is illustrated by a simple, cylindrical holewall. However as indicated in FIGS. 8 and 9, in practice the orifice can have a partially conical form in order to match to a correspondingly partially conically formed fastening screw.

The terms side surface (6, 6') and gable surface (7, 7'), respectively, are used in this description and in the appended claims without any intention of indicating the relative lengths of the two surfaces. Although the gable surfaces 7, 7' in the example are shorter than the side surfaces 6, 6', the former can be either longer or equally long as the latter. With other words, the cutting insert can have a square or a rectangular basic form, whereby the main cutting edges 8, 8' in the rectangular configuration can be positioned either along the longer or along the shorter side of the rectangle.

Figure 1:
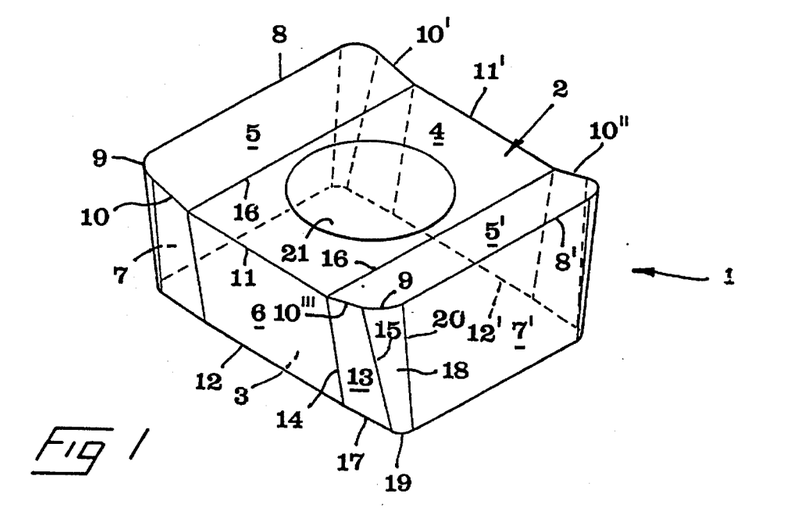
FIG. 1 illustrates a perspective view of a cutting insert according to the invention, the insert being shown in a schematic or purely geometrical form.
Figure 2:
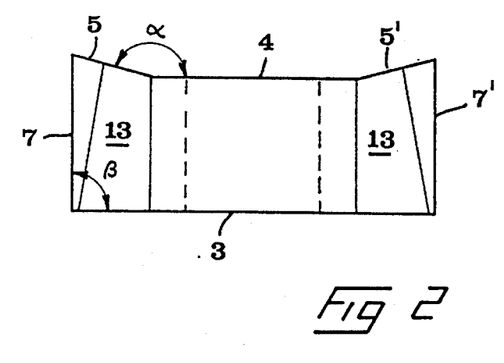
FIG. 2 illustrates a side view showing a side surface of the cutting insert according to FIG. 1.
Figure 3:
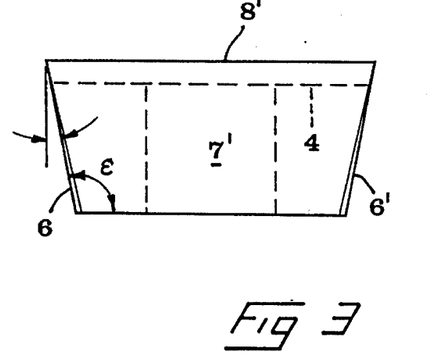
FIG. 3 illustrates an end view showing a side or gable surface of the cutting insert as seen from the right in FIG. 2.
Figure 4:
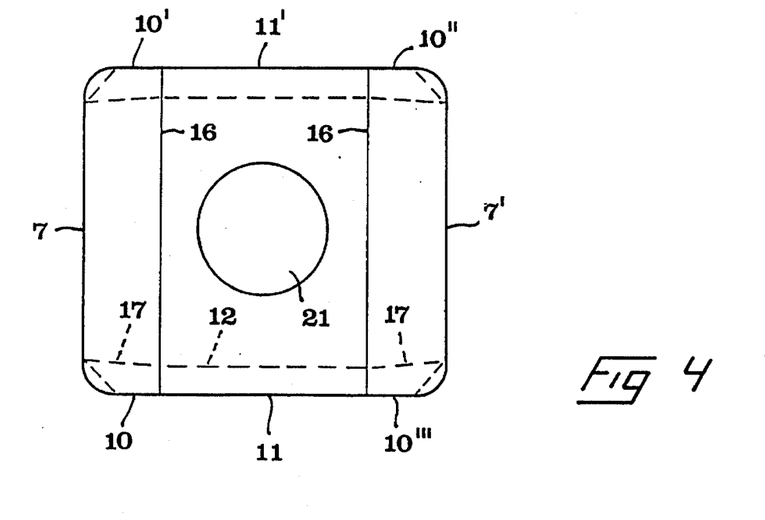
FIG. 4 illustrates a plane view from above of the cutting insert according to FIG. 1.
Figure 5:
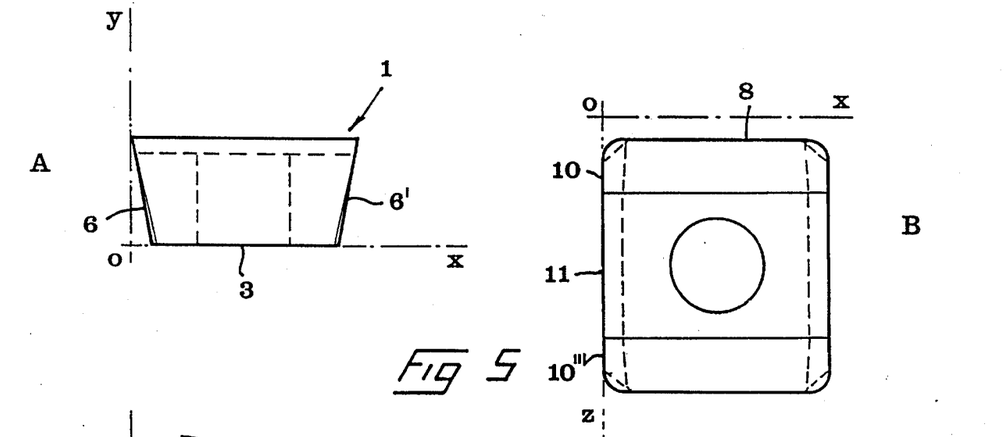
FIG. 5 illustrates an endview (A) and a plane view (B) of the cutting insert in a basic position.
Figure 6:
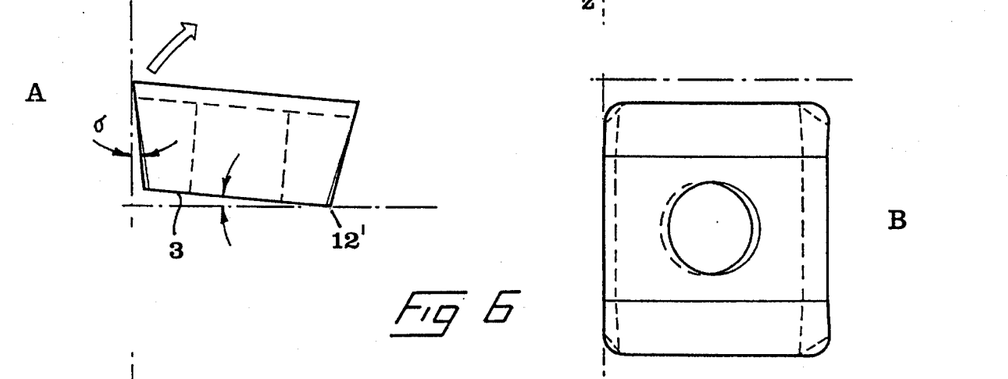
FIG. 6 illustrates an endview (A) and a plane view (B) of the same cutting insert in a tilted position.
Figure 7:
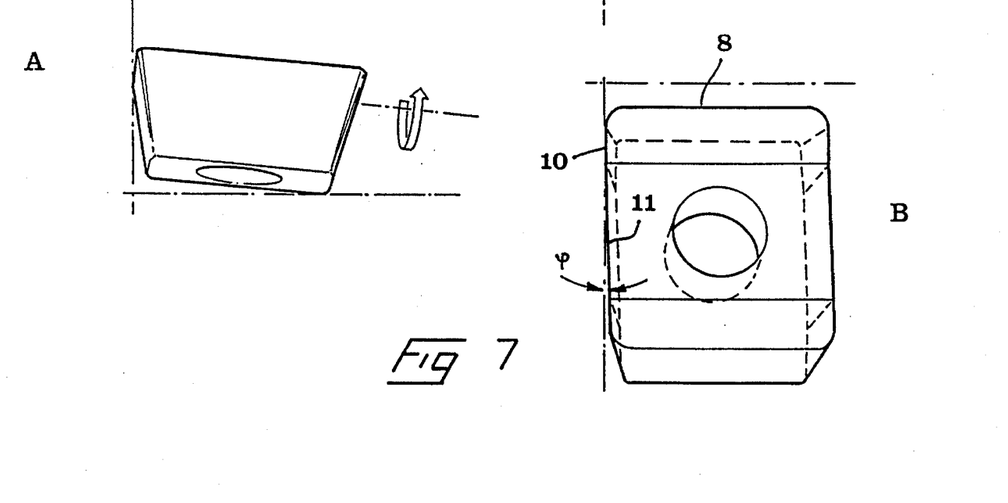
FIG. 7 illustrates analogous endviews (A) and plane views (B) in a tilted and in a turned position.

In order to clarify the concept on which the present invention is based reference is now made to FIGS. 5 to 7, in which the cutting insert according to the invention is shown in three different positions in relation to a coordinate system with the axes x, y, z that meet in an origo O. The imaginary horizontal plane in which the x- and z-axes are situated constitutes a first or horizontal reference plane, while the vertical plane in which the z- and y-axes are situated forms a second, vertical reference plane. In FIG. 5 the cutting insert 1 is shown in an initial position at which the base surface 3 is positioned in the horizontal plane x-z, with the edge line 11 and the secondary cutting edges 10, 10'" in the vertical reference plane y-z.

In the position shown in FIG. 6, the cutting insert has been tilted 5°, around the edge line 12' so that the base surface 3 forms an angle of 5° with the reference plane x-z. In this position, the inclination angle σ between the side surface 6 and the vertical reference plane y-z has been reduced from 10° in the position according to FIG. 5, to 5° in the position according to FIG. 6.

From the tipped position in FIG. 6, the cutting insert in FIG. 7 has been turned a bit, with the main cutting edge 8 being the turning axis. More specifically, the cutting insert has been turned by 15° in relation to the position shown in FIG. 6. As clearly shown in FIG. 7B, in this position a clearance is obtained between the edge line 11 and the vertical reference plane y-z when the secondary cutting edge 10 is in this reference plane. In this position, the main cutting edge 8 can still be located in the same vertical reference plane parallelly with the plane y-x as in the position according to FIG. 6, since the turning of the cutting insert around the main cutting edge 8 is effected without moving the latter.

At the mentioned, preferred angles ($\alpha$=165° and $\epsilon$=80°) a clearance angle $\phi$ of about 1° is obtained between the edge line 11 and the vertical reference plane y-z.

In the light of the above, it should be clear that the invention is based on a combination of three different features, viz.:

a) each one of the two side surfaces 6, 6' is inclined and forms an obtuse angle $\epsilon$ with the base surface 3, b) the secondary cutting edges 10, 10', which join a common main cutting edge, e.g. cutting edge 8, are situated in a common plane which forms an obtuse angle $\alpha$ with every imaginary plane that is parallel with the base surface 3, and c) the corner angle between the individual secondary cutting edge and the adjacent main cutting edge is equally large at all four corners 9.

At the realization of the theoretically described concept in relation with FIGS. 5 to 7, it should be observed that the individual supporting surface of the milling tool, on which the base surface 3 of the cutting insert lies, is axially and radially inclined with regard to a reference plane that extends radially from the rotation or central axis of the mill, and goes through the latter. More specifically, the angle of axial inclination of in relation to said radial reference plane should be 3° to 10°, suitably 4° to 7° and preferably about 5°, while the angle of radial inclination is about 10° to 20°, suitably 13° to 17° and preferably around 15°. In practice, said supporting surface can be formed in many different ways, e.g. directly on the milling cutter body as such, or be formed as a part of a cassette or holder which can be fastened on the milling cutter body.

In FIGS. 8 and 9 two different embodiments of the cutting insert are shown, whose upper surface is formed in different ways. In the drawings it can be seen that the two part surfaces 5, 5' not necessarily have to be planar. Thus, in the part surfaces 5, 5' there can be recesses or tooth-like configurations 22 intended to improve the chip conveying. This toothing can be surrounded by reinforcing faces 23, along the main cutting edge and the secondary cutting edges. Also the main upper surface 4 can comprise recesses of different sorts which together create an irregular, non-planar surface pattern. Thus, the essential is merely that the secondary cutting edges 10, 10', 10" and 10''' are situated in a common plane which is inclined in relation to the base surface of the cutting insert, while the surface that extends between a pair of cooperating secondary cutting edges can have a most varying contour form or surface pattern.

Figure 10:
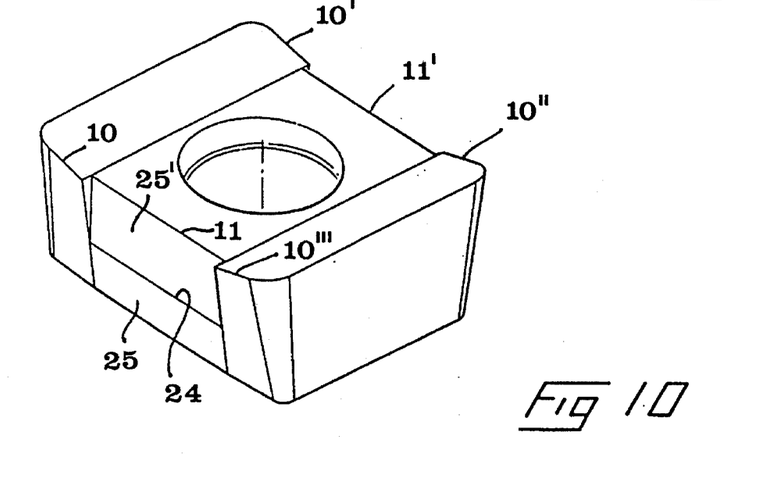
FIG. 10 illustrates a schematic perspective view of a cutting insert according to a further embodiment of the invention.
Figure 11:
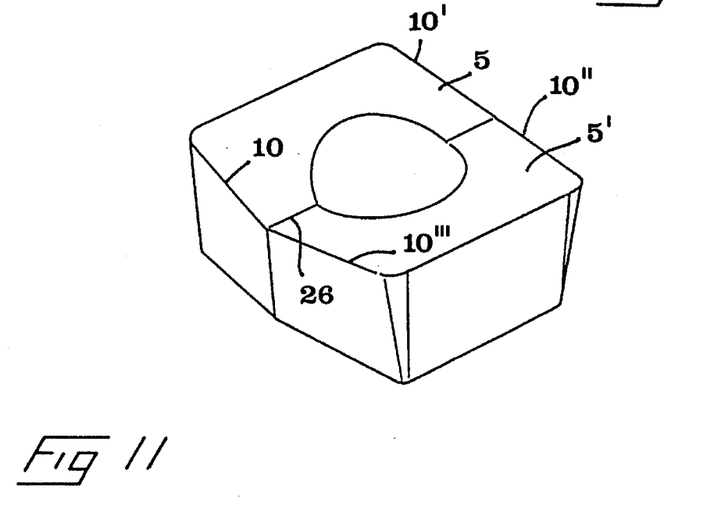
FIG. 11 also illustrates a schematic perspective view of a still further embodiment of a cutting insert according to the invention.
Figure 12:
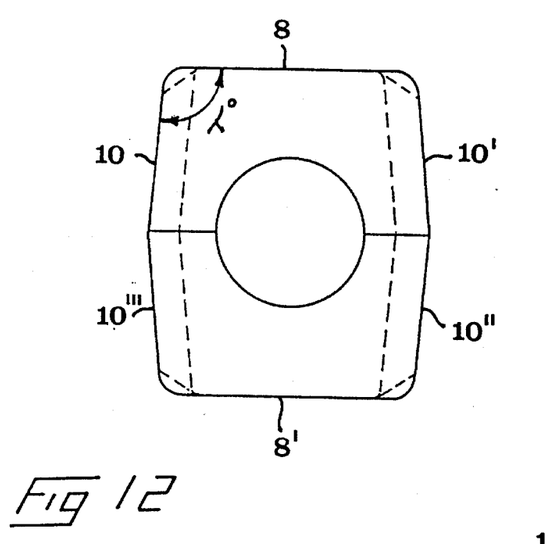
FIG. 12 illustrates a plane view from above of the cutting insert according to FIG. 11.
Figure 13:
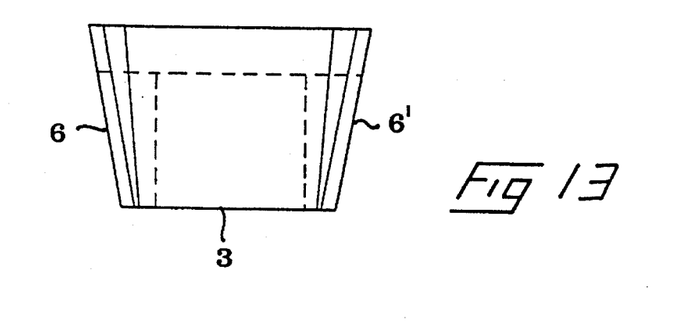
FIG. 13 illustrates an endview of the cutting insert according to FIGS. 11 and 12, showing a side surface thereof.
Figure 14:
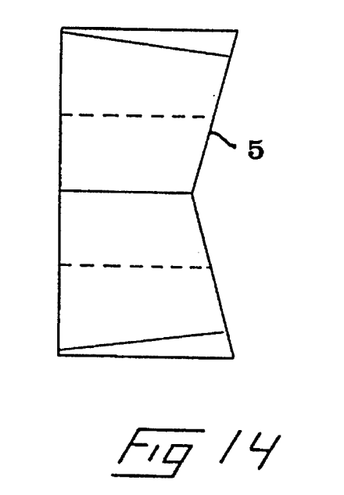
FIG. 14 illustrates a side view showing a side surface of the same cutting insert.

In FIG. 10 an embodiment is shown, according to which each one of the two side surfaces 6, 6' has been divided into two divisional surfaces 25, 25' by a divisional line 24, said divisional surfaces forming an obtuse angle with each other, e.g. in the range of 170° to 179°. This means that the edge lines 11 and 11' have been located within an imaginary, straight connecting line between the secondary cutting edges 10, 10''' and 10', 10", respectively. In this way, an enlarged clearance is achieved immediately behind each individual secondary cutting edge (cf. FIG. 7).

Still another embodiment of the present invention is illustrated in FIGS. 11 to 14. In this case, the previously foreseen plane upper surface 4 has been eliminated so that the two part surfaces 5, 5' on the upper surface of the cutting insert meet directly along a central break line 26. According to this embodiment, the length of the secondary cutting edges 10 will thus be substantially half the cutting insert's length.

Further, the corner angle $\lambda$ of the cutting insert according to FIGS. 11 to 14 is larger than the corresponding 90°-angle of the cutting insert corners according to FIGS. 1 to 4. Within the frame-work of the present invention it is possible to vary the corner angle $\lambda$ (not only at the embodiment according to FIGS. 11 to 14 but also according to the embodiment of FIGS. 1 to 4) within rather wide limits. Thus, the corner angle $\lambda$ can be smaller and larger than precisely 90°, such as 88° to 100°, suitably from 89° to 95°.

Figure 15:
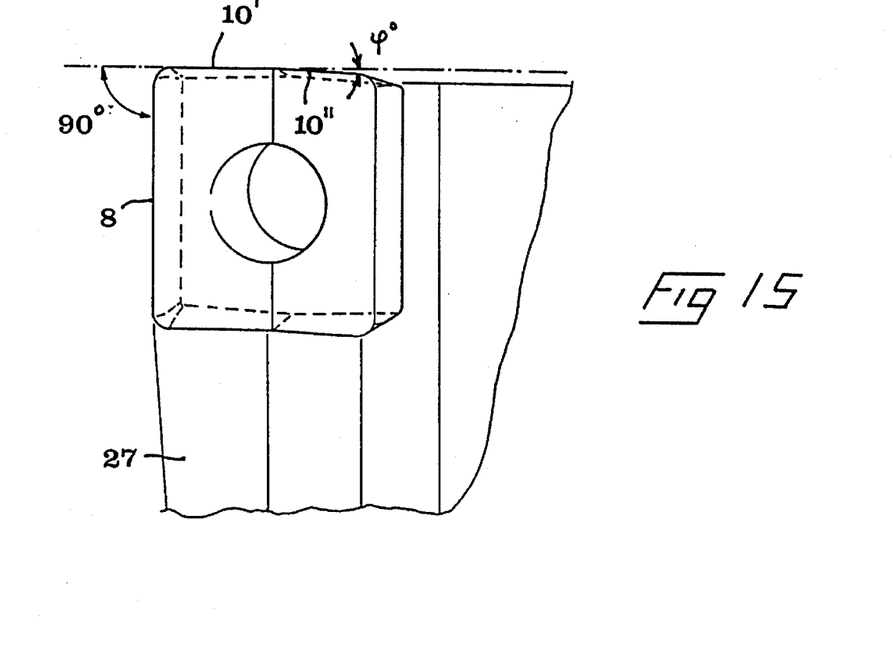
FIG. 15 illustrates a partial view of a part of a mill with a cutting insert according to FIGS. 11 to 14.

In FIG. 15 a cutting insert is shown according to the same basical embodiment as the one illustrated in FIGS. 11 to 14, mounted in a facemill 27. The corner angle $\lambda$ in this case can amount to 90°, although it can be both larger and smaller. Depending on the real corner angle of the cutting insert, the pertaining supporting surface of the mill 27 can be oriented in the way basically described in connection with FIGS. 5 to 7, so that the milled angle becomes 90°. In the shown example, the secondary cutting edge 10' serves as active edge, whereby necessary clearance $\phi$ is attained between the secondary cutting edge 10" and the milled surface on the workpiece.

Figure 16:
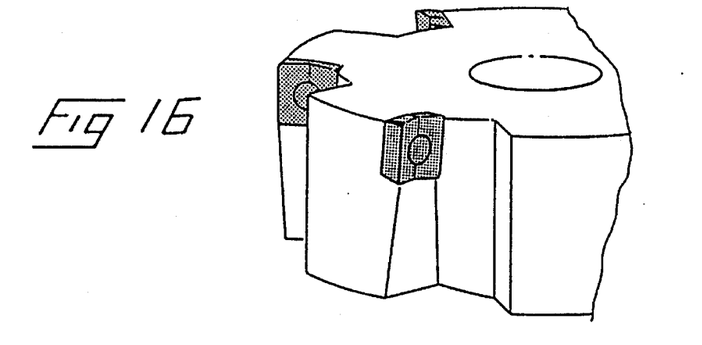
FIG. 16 illustrates a partial perspective view of a facemill according to a right-cutting embodiment with cutting inserts according to FIGS. 11 to 14.
Figure 17:
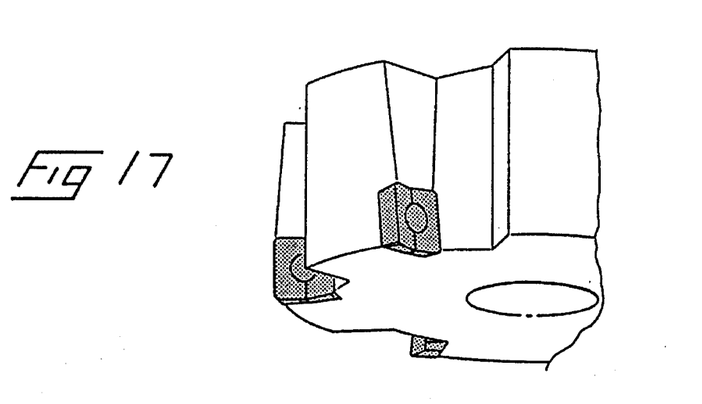
FIG. 17 illustrates a similar perspective view showing a left-cutting facemill.

In FIGS. 16 and 17 is illustrated how one and the same cutting insert can be used on a right-cutting mill (FIG. 16) as well as on a left-cutting mill (FIG. 17).

Figure 18:
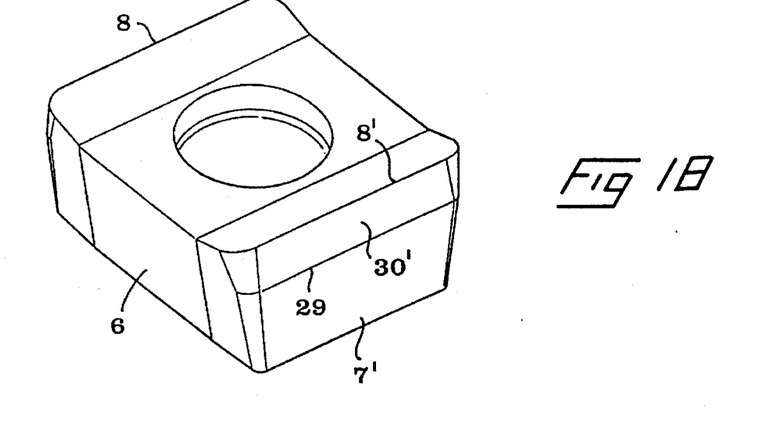
FIG. 18 illustrates a perspective view of still another embodiment of the cutting insert according to the invention.
Figure 19:
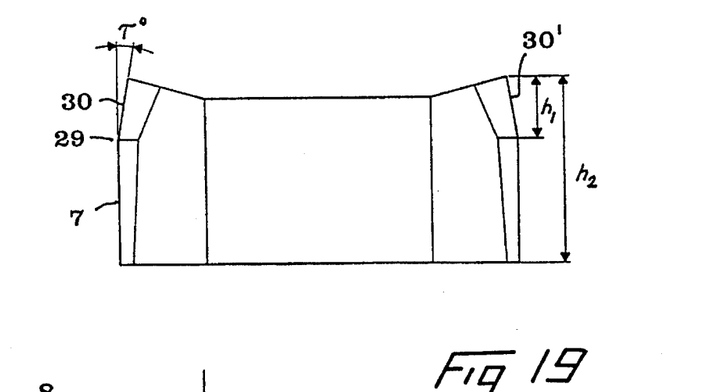
FIG. 19 illustrates a side view of the cutting insert according to FIG. 18.

In FIGS. 18 and 19 a further embodiment of the cutting insert according to the invention is shown, according to which each one of the two gable surfaces 7, 7' is formed with an angle-broken contour. More specifically, the two surfaces 7, 7' join upper part surfaces 30, 30' via break-lines 29, which surfaces 30, 30' form an angle $\tau$ with the extension of the plane of the adjacent part gable surface 7 and 7', respectively. In practice, this angle $\tau$ can be between 0° and 12°. The angle-broken surface 30 has a height $h_1$ which suitably is smaller than the height of the part surface 7, 7'. The total height $h_2$ should be 1,5 to 5 times greater than the height $h_1$. Thus, in practice the height $h_1$ can amount to 1 to 3 mm and the height $h_2$ to 4,5 to 5 mm.

By the angle-broken contour of each gable surface according to FIGS. 18 and 19, the cutting insert is allotted a smaller clearance adjacent to the cutting edge, which renders the cutting edge stronger than on the previously shown cutting inserts.

The different embodiments of the cutting insert according to the invention as described above with reference to FIGS. 1 to 19 exist in a standardized basic form which is brought about at the very manufacturing of the cutting insert, which according to conventional technique is based on the use of a hard metal-forming powder. More specifically, a pressing method is used according to which the hard metal-forming powder first is given the desired shape in a suitable pressing device and then it is given its final hardness by sintering in an oven at a temperature above 1000° C. The pressing operation has been improved over the years and nowadays is so rational that there is a fair possibility to form the cutting edge with adjacent chip-forming surfaces and possible reinforcing faces with great exactitude. As initially mentioned, the cutting inserts can also be subjected to a finishing treatment, e.g. peripheral grinding and special treatment for strengthening the cutting edges; however without altering the basic shape of the cutting insert.

The cutting insert according to the invention is extensively applicable in several technical fields in its standardized basic form, possibly after a finishing treatment. However, according to a particular aspect of the present invention, the possibility is foreseen to subject the cutting insert to a special after-grinding of the same, more specifically by grinding in at least one of the four side surfaces, thereby grinding at least one surface that wholly or partially extends in a negative angle to the side surface in which it is made, thus modifying said basic form. With reference to FIGS. 20 to 26 follows below a description of a number of embodiments of cutting inserts whose basic forms have been modified in different ways.

Figure 20:
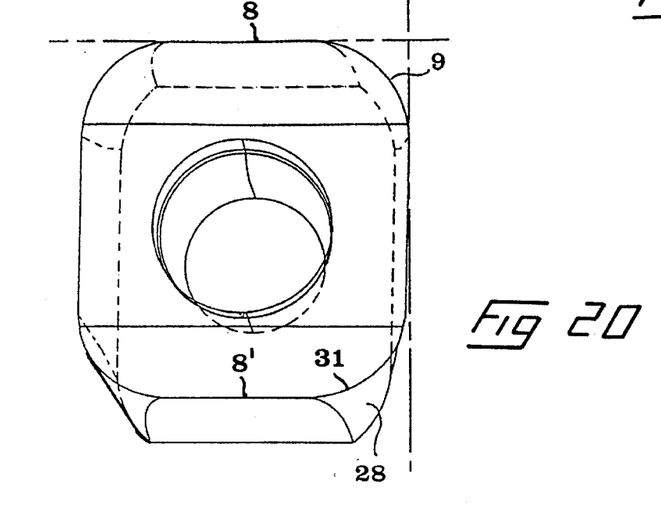
FIG. 20 illustrates a transparent, schematic perspective view from above, showing a cutting insert according to FIGS. 1 to 4, which according to a particular aspect of the invention has been modified with regard to its form by after-grinding of the cutting insert, the form modification having taken place at all four corners of the cutting insert by conferring them a rounded shape.

In FIG. 20 a cutting insert 1a is shown which has the same basic form as the insert in FIGS. 1 to 4 and which has been modified with regard to its form in that at all four corners a rounded surface 28 has been ground. By these ground surfaces each one of the two main cutting edges 8, 8' will at opposite ends join adjacent rounded cutting edge portions 31 of relatively large radius. This cutting insert is indexable in four different positions on a milling tool, e.g. for the machining of a groove bottom, whereby each one of the four corners of the cutting insert can be used for machining one of the side surfaces and a bottom surface of the groove, the latter being perpendicular to the former.

Figures 21, 22, 23, 24:
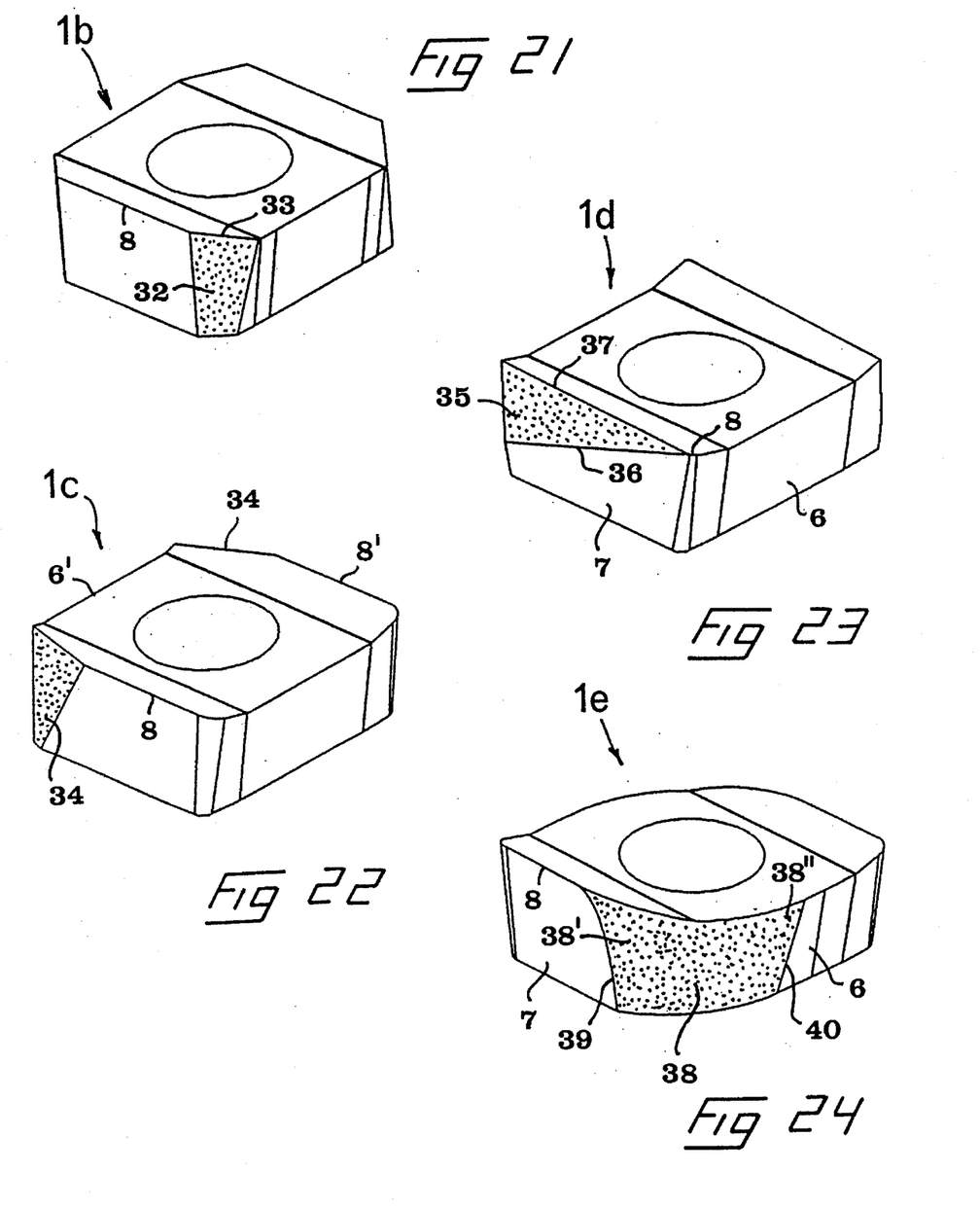
FIG. 21 illustrates a perspective view showing how the basic form of the cutting insert has been modified by plane ground surfaces at all four corners.
FIG. 22 illustrates a similar perspective view showing a shape modification at only two corners by plane ground surfaces.
FIG. 23 illustrates a perspective view showing a cutting insert with shape-modified, plane ground surfaces only along the two opposite side or gable surfaces.
FIG. 24 illustrates a perspective view showing a cutting insert with rounded ground surfaces at two diametrically opposed corners.

In FIG. 21 a cutting insert 1b is shown which likewise has been modified in shape by ground surfaces 32 at all four corners. However, in this case the individual ground surface 32 is plane in order to give a plane bottom at grooving, which bottom joins the side surfaces via two plane chamfer surfaces instead of rounded transitions of the type obtained with an insert according to FIG. 20.

According to the invention, a shape-modifying ground surface may be present at two of the insert's four corners, but not at the two other corners. In FIG. 22 a cutting insert 1c is shown comprising plane ground surfaces 34 adjacent to the two corners of the insert that are present along a common side surface 6'. In this case, the remaining two corners are maintained in their original basic form, the purpose of the ground surfaces 34 being to shorten the effective length of the main cutting edges 8, 8'. Such an insert is particularly useful for side and facemills for narrow grooves, whereby the main cutting edges of cooperating inserts on the two opposed sides of the side and facemill do not have to overlap each other more than absolutely necessary. Furthermore, the advantage is achieved that the cutting insert can maintain a relatively large abutment or base surface also in relatively narrow milling cutters.

In all the embodiments according to FIGS. 20 to 22 (and also according to the embodiments in FIGS. 23 to 26), the surfaces 28, 32 and 34 are negatively ground in relation with the original side surface(s) in which they are ground, more specifically in a negative angle from 5° to 10°. If one presumes that the angle (β in FIG. 2) between surface 7 and the base surface 3 is exactly 90°, then the angle between the base surface and either of the ground surfaces 28, 32, 34 will be between 80° and 85°.

In FIG. 23 a cutting insert 1d is shown comprising a shape-modifying ground surface 35 on the two opposed gable surfaces. In the shown example the ground surface 35 is delimited by an inclined break-line 36 and an edge line 37 in the continuation of the main cutting edge 8 of which a short portion has been kept in the immediate proximity of a cutting corner. Also the surface 35 is ground with a negative angle within the range 5° to 10° in relation with the gable surface 7. Thus, if the gable surface 7 extends perpendicularly towards the base surface 3, then the ground surface 35 forms an angle of 80° to 85° with the base surface. Further, the grinding is so located that the edge line 37 extends in an angle of 1° to 5°, suitably about 3°, to the original main cutting edge 8. This insert is particularly suited for side and facemills for the machining of the side surfaces and the rounded transitions in a groove, without influencing the bottom of the groove.

In FIG. 24 a cutting insert 1e is shown that, equally to the insert of FIG. 22, comprises shape-modifying ground surfaces 38 at two of the corners, while the two other corners are maintained in their original form. However, in this case the ground corners are diametrically opposite to each other and, moreover, the ground surfaces are vaulted and form rounded transitions between the side surface 6 and the gable surface 7 on the insert. Thus, for this embodiment the insert can be formed with an important radius-modification at the same time as a considerable portion of the main cutting edge can be maintained intact. The ground angle of the vaulted surface 38 to the base surface varies from being negative in the area of the first surface end portion 38' adjacent to the main cutting edge 8 that extends along the gable surface 7, to being positive in the area of an opposite second surface end portion 38" adjacent to the side surface 6. Adjacent to the main cutting edge 8 the surface 38 can thus have a ground angle of −10°, whereafter the angle is evenly altered along its extension, to eventually reach a value of +10° (corresponding to the angle ε in FIG. 3) at the transition point to the side surface 6. It may be noted that the delimiting line 39 between the gable surface 7 and the surface end portion 38' is arc-shaped, while the delimiting line 40 between the side surface 6 and the surface end portion 38" is straight.

Figure 25:
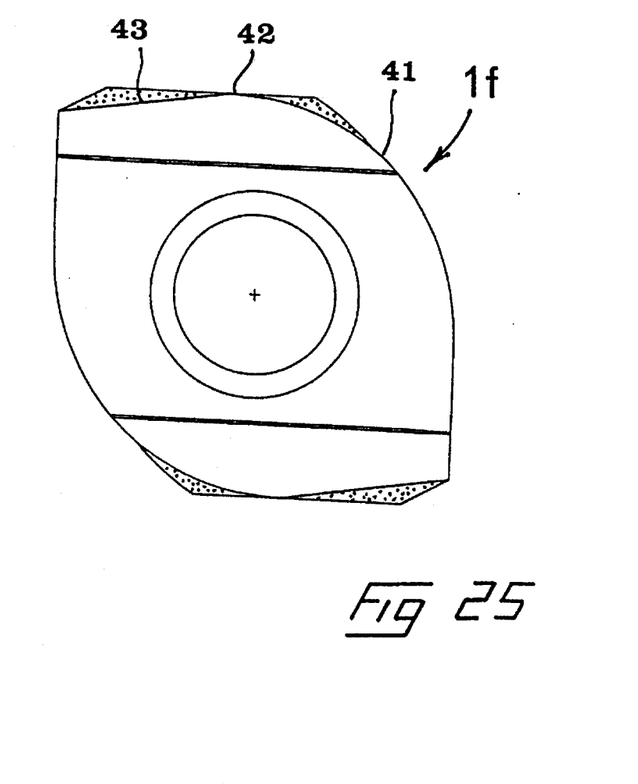
FIG. 25 illustrates a plane view from above of still another embodiment of a cutting insert with radius-modified corners.
Figure 26:
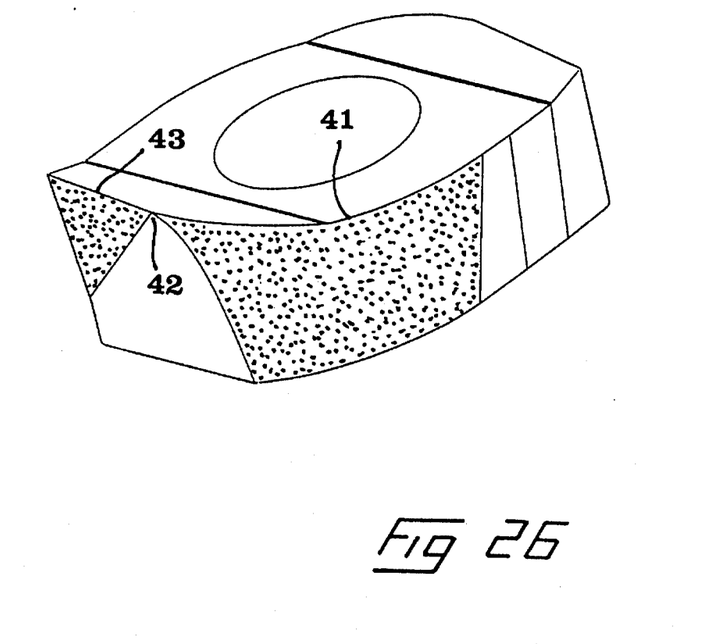
FIG. 26 illustrates a perspective view of a cutting insert according to FIG. 25.

In FIGS. 25 and 26 a cutting insert 1f is shown of substantially the same sort as the insert in FIG. 24, but which has been further modified by after-grinding the remaining portion of the gable surface 7. More specifically, the gable surface has been ground so that the rounded corners 41 of the cutting edge start off from an apex 42 and continue into an edge line 43 that extends obliquely and rearwardly from said apex. During milling the rounded corner 41 is usually active, but normally not the edge 43 extending from the apex 42 (although occasionally also parts of this edge can be used for undercutting of a groove bottom). The edge line can extend in 1° to 5°, suitably around 3° in relation with the main cutting edge in the basic embodiment, the edge line being either straight or slightly curved. In practice this cutting insert is particularly suited for machining of substantially only the radius transition in milled grooves, preferably grooves with large transition radii.

The advantages of the cutting inserts exemplified in FIGS. 20 to 26 are obvious. Thus, according to this aspect of the invention the possibility is offered to manufacture in series cutting inserts with a repeatable, always returning standardized basic form, whereafter the basic form of the inserts is modified in the desired way depending on the intended use, more specifically by after-grinding of the insert obtained at sintering. In this way the inserts can be tailor-made, all according to the particular wishes of the customer. Thereby, the shape modification can be effected either by the insert manufacturer or by the customer.

It is clear that the invention is not restricted to the embodiments described above. Thus, it is for instance feasible to spare the hole for a fastening screw and instead fasten the insert by clamping means. Moreover, the geometry of the insert can be modified in various ways, in its basic form and in its shape after a finishing grinding, within the framework of the appended claims.

I claim:

1. A cutting insert for a milling tool comprising upper and lower, opposite surfaces of which at least the lower is substantially planar in order to form a contact surface to be placed upon a corresponding supporting surface of the milling tool, opposite first and second side surfaces and opposite first and second gable surfaces, each gable surface forming a main cutting edge along an edge line being distanced from the lower surface, secondary cutting edges extend along said first and second side surfaces and join the main cutting edges to form four corners, each of the two first and second side surfaces is inclined with and forms an obtuse angle ($\epsilon$) with the lower surface, each two of the secondary cutting edges that are adjacent to a common one of the main cutting edges are located in a common plane that forms an obtuse angle ($\alpha$) with an imaginary plane being parallel with the lower surface, and corner angles between each secondary cutting edge and the adjacent main cutting edge are equal at the four corners.

2. Cutting insert according to claim 1, wherein the angle ($\alpha$) between the plane that is common for the secondary cutting edges and the base surface is between 155° and 175°.

3. Cutting insert according to claim 2, wherein the angle ($\alpha$) is between 160° and 170°.

4. Cutting insert according to claim 3, wherein the angle ($\alpha$) is preferably in the range of 164° to 166°.

5. Cutting insert according to claim 1, wherein the obtuse angle ($\epsilon$) between the lower surface and each of the side surfaces is between 95° and 11°.

6. Cutting insert according to claim 5, wherein the inner angle ($\epsilon$) is preferably 97° to 105°.

7. Cutting insert according to claim 1, wherein an inner angle ($\beta$) between the lower surface and each of the gable surfaces is between 85° and 100°.

8. Cutting insert according to claim 7, wherein the inner angle ($\beta$) is between 87° and 94°.

9. Cutting insert according to claim 8, wherein the inner angle ($\beta$) is preferably around 90°.

10. Cutting insert according to claim 1, wherein a plane facet surface extends from each of the individual secondary cutting edges to the lower surface, a lower edge line of each of said facet surfaces being oblique to a straight lower edge line between the lower surface and a part of the side surface on which there is no facet surface.

11. Cutting insert according to claim 10, wherein an angle between the lower edge line of the facet surface and an imaginary straight extension of said lower edge line between the lower surface and the part side surface is between 1° and 3°.

12. Cutting insert according to claim 11, wherein the angle between the lower edge line of the facet surface and the imaginary straight extension of said lower edge line between the base surface and the main side surface is 1.5° to 2.5°.

13. Cutting insert according to claim 12, wherein the angle between the lower edge line of the facet surface and the imaginary straight extension of said lower edge line between the base surface and the main side surface is preferably about 2°.

14. Cutting insert according to claim 1, wherein the corner angle between a secondary cutting edge and the adjacent main cutting edge is between 88° and 100°.

15. Cutting insert according to claim 14, wherein the corner angle between the secondary cutting edge and the adjacent main cutting edge is suitably between 89° and 95°.

16. Cutting insert according to claim 1, wherein each of the gable surfaces comprises a divided surface adjacent to one of the main cutting edges.

17. Cutting insert according to claim 1, wherein in at least one of said side surfaces or said gable surfaces, a surface is ground after manufacturing of the cutting insert into a standardized basic form, which ground surface wholly or partially extends in a negative angle in relation to the side surface or the gable surface, in which it is ground, thus modifying said basic form.

18. Cutting insert according to claim 17, wherein the form-modifying ground surface (34, 38) is located at two of the four corners, but not at the other two corners.

19. Cutting insert according to claim 18, wherein the two form-modified corners are diametrically opposite to each other.

20. Cutting insert according to claim 17, wherein the ground surface is vaulted and forms a rounded transition between a side surface and a gable surface in modification of a corner radius.

21. Cutting insert according to claim 20, wherein the grinding angle of the vaulted surface in relation to the base surface varies from being negative in the area of a first surface end portion adjacent to a main cutting edge that extends along a gable surface, to being positive in the area of an opposite, second surface end portion adjacent to a side surface.

22. Cutting insert according to claim 20, wherein surfaces are ground in a gable surface, which ground surfaces confer to the main cutting edge a rounded corner with a certain radius, which rounded corner starts at an apex and goes into an edge line which extends obliquely and rearwardly from said apex.

23. Cutting insert according to claim 17, wherein the form-modified ground surface is plane.

24. Cutting insert according to claim 23, wherein said ground surface is ground into a gable surface, in order to reduce an effective length of the main cutting edge.

25. A milling tool comprising:

supporting surfaces for locating cutting inserts at locations at a periphery, distanced from a central, rotational axis, each of the supporting surfaces, against which a lower surface of one of the cutting inserts is intended to abut, is axially and radially inclined in relation to a radially extending reference plane through said axis, the milling tool is arranged to include cutting inserts according to claim 1 and the angle for the axial inclination in relation to said reference plane is between 3° and 10°, while the angle for the radial inclination is from 10° to 20°.

26. Milling tool of claim 25, wherein the angle for the radial inclination is suitably from 13° to 17°.

27. Milling tool of claim 26, wherein the angle for the radial inclination is preferably about 15°.

28. Milling tool of claim 25, wherein the angle for the axial inclination in relation to said reference plane is between 4° and 7°.

29. Milling tool of claim 28, wherein the angle for the axial inclination in relation to said reference plane is preferably around 5°.

30. The cutting insert of claim 1, wherein the milling tool is a facemill.

31. The cutting insert of claim 1, wherein the milling tool is a side-and-facemill.

* * * * *